United States Patent [19]
Zheng et al.

[11] Patent Number: 6,044,030
[45] Date of Patent: Mar. 28, 2000

[54] FIFO UNIT WITH SINGLE POINTER

[75] Inventors: Jie Zheng, Mountain View; William Webster Kolb; Hartmut Karl Habben, both of Sunnyvale, all of Calif.

[73] Assignee: Philips Electronics North America Corporation, New York, N.Y.

[21] Appl. No.: 09/217,428

[22] Filed: Dec. 21, 1998

[51] Int. Cl.[7] ................................................. G11C 7/00
[52] U.S. Cl. .............. 365/221; 365/189.02; 365/189.05; 365/230.02; 365/236
[58] Field of Search .............................. 365/221, 189.01, 365/230.02, 189.02, 236, 189.05

[56] References Cited

U.S. PATENT DOCUMENTS

| | | | |
|---|---|---|---|
| 5,274,600 | 12/1993 | Ward et al. | 365/221 |
| 5,365,485 | 11/1994 | Ward et al. | 365/221 |
| 5,388,074 | 2/1995 | Buckenmaier | 365/189.05 |
| 5,566,371 | 10/1996 | Ogawa | 365/221 |
| 5,623,449 | 4/1997 | Fischer et al. | 365/221 |
| 5,669,013 | 9/1997 | Watamabe et al. | 395/825 |
| 5,732,011 | 3/1998 | Schmidt | 365/74 |

FOREIGN PATENT DOCUMENTS

| | | | |
|---|---|---|---|
| 59-211136 | 11/1984 | Japan . | |
| 0812987 | 5/1996 | Japan | G11C 7/00 |
| 9641266 | 12/1996 | WIPO | G06F 12/06 |

*Primary Examiner*—Son T. Dinh
*Attorney, Agent, or Firm*—Anne E. Barschall

[57] ABSTRACT

A FIFO unit for buffering serial communications includes a register and a unit for maintaining a single pointer. The single pointer functions as an IN pointer during writes and an OUT pointer during reads. The same circuitry maintains the pointer for both reads and writes to the FIFO. This circuitry preferably includes a single counter. If an error occurs during reading, the single pointer can be reinitialized and reading restarted, without loss of data. The register is not erased until reading is complete.

14 Claims, 2 Drawing Sheets

FIFO UNIT WITH SINGLE POINTER

BACKGROUND OF THE INVENTION

1. Field of the Invention

The invention relates to FIFO units used for buffering serial data.

2. Related Art

Usually in a serial communication application, a FIFO is used to buffer output data in case access to a data bus is lost. If access to the bus is lost in the middle of a transmission, the output data has to be re-sent from the FIFO when access to the data bus is regained. Normally, the FIFO therefore requires two pointers, an IN pointer and an OUT pointer. Each of these pointers requires circuitry to maintain it.

There has been a long-felt need for simplification of FIFO units. For instance, U.S. Pat. No. 5,732,011 illustrates a FIFO unit where the pointer unit is simplified. The patent speaks of creating a single pointer means, but the pointer means still needs to specify three pointers to operate the FIFO.

SUMMARY OF THE INVENTION

The object of the invention is to simplify a FIFO unit.

The simplified FIFO unit has only a single pointer. During reading from the FIFO, the pointer can be reset in response to an interrupt without erasing of the contents of the FIFO unit, so that reading can begin again after the interrupt is over.

BRIEF DESCRIPTION OF THE DRAWINGS

The invention will be described by way of non-limiting example with reference to the following figures.

DETAILED DESCRIPTION OF THE PREFERRED EMBODIMENTS

Figure 1:
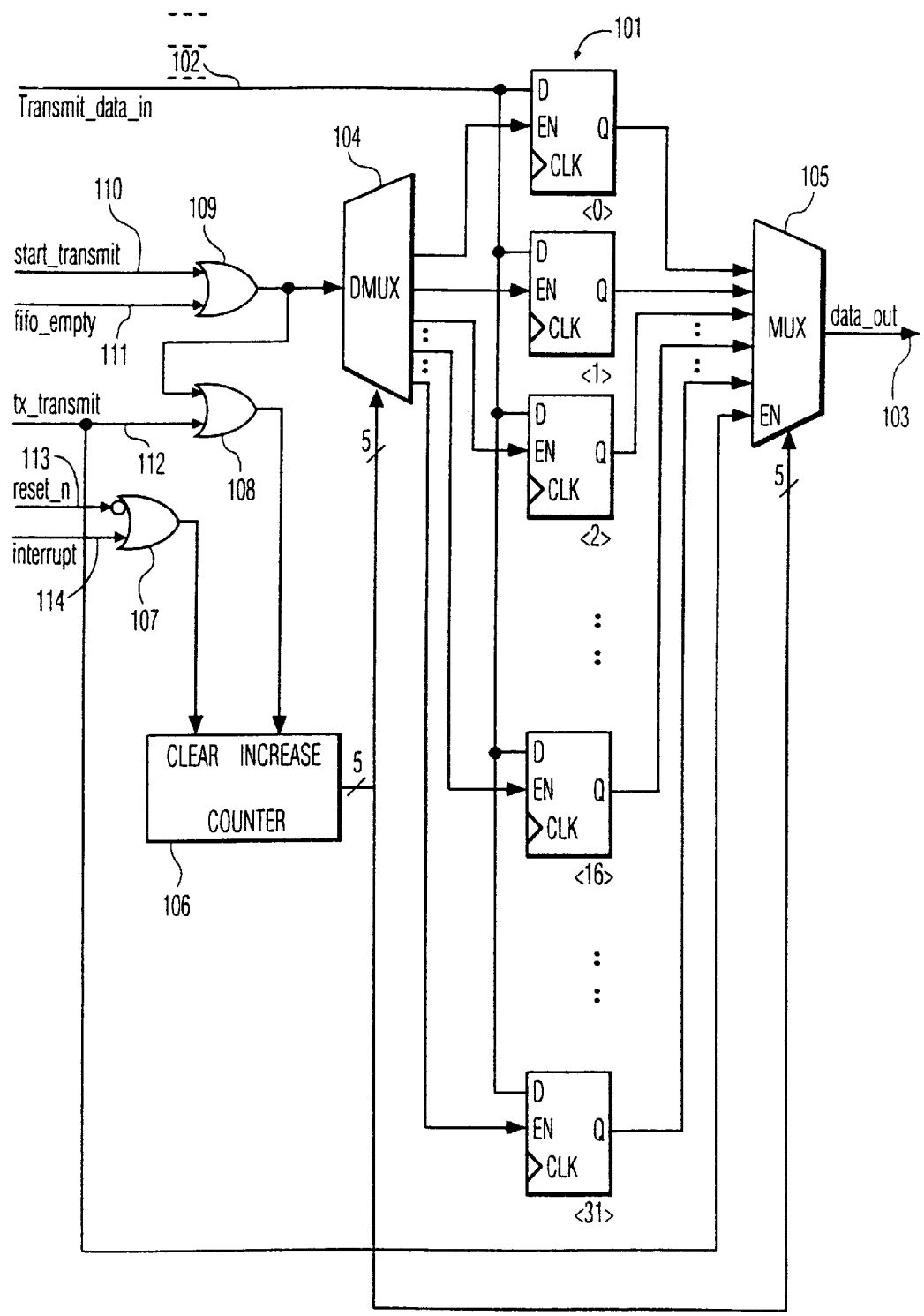
FIG. 1 shows a FIFO unit in accordance with the invention.

FIG. 1 shows a FIFO unit in accordance with the invention. This unit includes 32 flip-flops 101 for storing a word in the FIFO unit. The flip-flops 101 together constitute a register.

The FIFO is loaded from the Transmit_data_in line 102 and unloaded from the data_out line 103. Data bits from Transmit_data_in are accepted by the flip-flops 101 in accordance with enable signals EN from DMUX 104. Data bits from the flip-flops 101 are multiplexed by MUX 105 one by one from the Q outputs of the flip-flops 101 to data_out.

Control logic for the FIFO unit includes five-bit counter 106; OR gates 107, 108, 109; and control bit lines: start_transmit 110, fifo_empty 111, tx_transmit 112, reset_n 113, and interrupt 114.

The five-bit counter 106 holds the single pointer which is used both for reading from and for writing to the register 101.

Start_transmit will be held high for the first part of a data transmission. Let us take the example of a 96 bit communication. Not all 96 bits can fit in register 101. They must be taken in three 32-bit pieces. For the first thirty-two bit piece, start_transmit will be held high. After the first thirty-two bits, start_transmit will be forced low again.

As start_transmit goes low, tx_transmit will be forced high and held high until a signal from the receiving device indicates that the current thirty-two bit piece is received. Since writing new data to the register must a) await completion of reading old data from the register and b) occur before tx_transmit goes high again, the register must able to be reloaded between a) and b).

Typically, the ability to reload the register within the allotted time will depend on the register being small. The designer must determine a time t1 between the completion of a previous transmission and the start of a next transmission. The designer must further determine a time t2 necessary to load one bit into the FIFO. The maximum number of bits in the register must then be t1/t2. In the preferred embodiment, the register is 32 bits long. Those of ordinary skill in the art can readily adapt the invention to other numbers of bits, as well, e.g. 64 bits.

As the tx_transmit is forced low again, the fifo_empty line will be forced high to allow the next thirty-two bit piece to be loaded into the register 101.

Reset_n is normally forced low for a single clock cycle when either a thirty-two bit piece has been loaded or when it has been successfully transmitted.

Interrupt is only forced high when there is an error reading from the register 101.

The output of gate 109 is coupled both to an enable input of DMUX 104 and to an input of gate 108. The output of gate 108 is coupled to an increase input to the counter 106. Gate 107 has an inverting input coupled to receive reset_n 113, and a non-inverting input coupled to receive interrupt 114. Either start_transmit 110 or fifo_empty 111 must be high to enable the demultiplexer 104, via the output of gate 109. This output of gate 109 is also an input to gate 108. Either tx_transmit 112 or the output of gate 109 must be high to cause the counter to increment. Reset_n 113 must be low or interrupt 114 must be high to reset the counter 106.

The output of the counter 106 is coupled both to DMUX 104 and to MUX 105.

Figure 2:
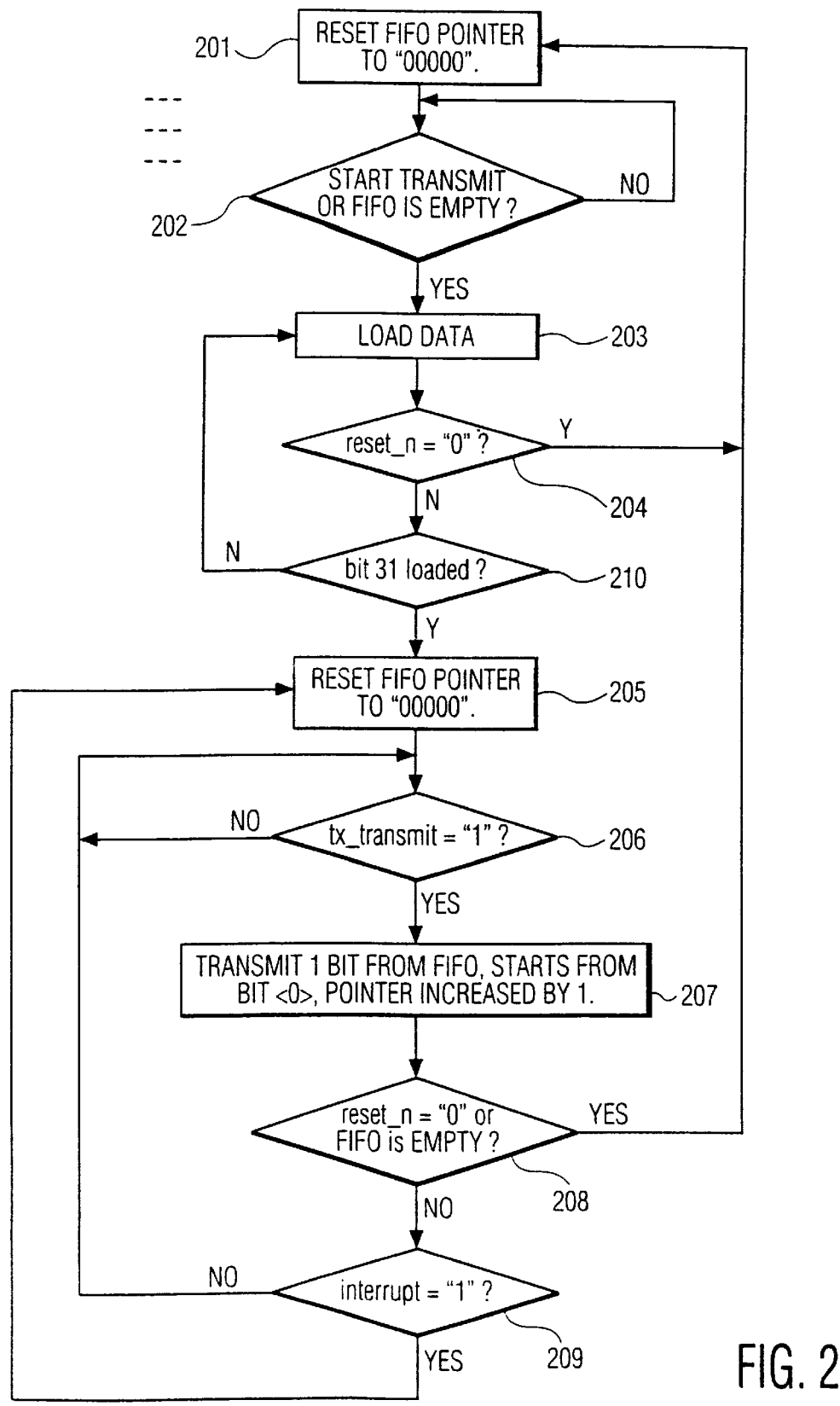
FIG. 2 shows a flowchart indicating the order of operations of the elements of the FIFO unit.

FIG. 2 is a flowchart showing the order of operation of the elements of FIG. 1. At 201 the single FIFO pointer, stored in counter 106, is reset to '00000'. Box 202 corresponds to gate 109, if either start_transmit or fifo_empty is high, data is to be loaded per 203 into the register 101. During loading, gate 108 causes incrementation of the counter 106 to insure updating of the register 101 at the proper bit location. If reset_n goes low during loading, per box 204 control returns to 201. Upon completion of loading after box 210, reset_n will go low at 205, resetting the counter 106.

If tx_transmit is high, per box 206, reading should occur from the register 101. Gate 108 insures that counter 106 is incremented during reading from the register 101 just as it was during writing to the register 101, per box 207. Once the FIFO is empty, fifo_empty will go high at box 208. Then operation should return to box 201. On the other hand, if the interrupt line is high, at 209, then operation should return to box 205, where the pointer is reset and reading of the data in the register 101 will begin again. If the interrupt line is low and the fifo_empty line is low at 209 then operation returns to box 206, to continue reading bits from register 101.

The linear nature of the flow chart of FIG. 2 necessarily fails to reflect all the possibilities of the circuit of FIG. 1, which is actually somewhat parallel in its testing of conditions. For instance, if tx_transmit is low at 206 and if start_transmit or fifo_empty were high, operations would in fact be back at box 203. However, the flow chart gives an intuitive understanding of how the FIFO unit of FIG. 1 is intended to be used.

Those of ordinary skill in the art may devise many other embodiments of the single pointer FIFO of the invention, for instance the write enable demultiplexer 104 might be designed to demultiplex the input data rather than the enable signals.

We claim:

1. A FIFO unit for use in buffering serial communication comprising
   a. a serial input;
   b. a serial output;
   c. a fixed number of bit storage units, coupled to receive serial data from the serial input and to provide serial data to the serial output; and
   d. means for maintaining a single pointer, which pointer functions as an IN pointer during writes to the storage units and as an OUT pointer during reads from the storage units.

2. The unit of claim 1 further comprising logic means for, during reading from the FIFO unit but prior to completion of reading, resetting the single pointer in response to an interrupt to allow reading to begin again on the same data.

3. The unit of claim 1 wherein the fixed number is determined by a length of time between reading of a previous set of data from the FIFO unit and loading a next set of data to the FIFO.

4. The unit of claim 3 wherein the fixed number is less than 64.

5. The unit of claim 3 wherein the fixed number is 32.

6. The unit of claim 1 further comprising:
   a. a write enable demultiplexer, coupled between the serial input and the bit storage units, arranged to write a single incoming bit to a first specified one of the bit storage units; and
   b. a read multiplexer, coupled between the bit storage units and the serial output, arranged to read a single outgoing bit from a second specified one of the bit storage units, which first and second specified ones may or may not be the same bit.

7. The unit of claim 4 wherein the means for maintaining comprises a single counter arranged to maintain a single count value corresponding to an IN or OUT pointer, depending on whether a write or read, respectively, is occurring, the counter being coupled to both the read multiplexer and the write multiplexer for specifying the first or second specified one, depending on whether a write or a read is occurring, respectively.

8. The unit of claim 1 wherein the means for maintaining comprises a single counter arranged to maintain a single count value corresponding to a IN or OUT pointer, depending on whether a write or read, respectively, is occurring.

9. The unit of claim 4 further comprising control logic coupled to control the multiplexers and counter, the control logic including
   a. a plurality of control bit input lines; and
   b. a plurality of gates.

10. The unit of claim 9 wherein the control bit input lines comprise
    a. a start transmit line;
    b. a FIFO empty line;
    c. a transaction transmit line;
    d. a reset line; and
    e. an interrupt line.

11. A method for buffering serial data, the method comprising
    a. loading data into a fixed length storage unit, the loading comprising
       i. initializing a single pointer, using a single pointer maintaining circuit;
       ii. loading data to a bit pointed to by the single pointer;
       iii. incrementing the single pointer; and
       iv. repeating a. ii. and a. iii. until the fixed length storage unit is filled or input data is exhausted;
    b. upon completion of loading, reading the FIFO, the reading comprising:
       i. initializing the single pointer, using the single pointer maintaining circuit;
       ii. reading out a bit pointed to by the single pointer;
       iii. incrementing the single pointer, using the pointer maintaining circuit;
       iv. if an interrupt indication is received, restarting reading by returning to b. i.;
       v. repeating b. ii. through b. iv. until all data in the fixed length storage unit is read;
    c. if more data remains to be transmitted, returning to a; whereby the single pointer functions as an IN pointer of a FIFO during loading and as an OUT pointer of the FIFO during reading.

12. The method of claim 9 further comprising
    receiving an interrupt during the reading;
    reinitializing the single pointer in response to the interrupt; and
    restarting reading after the interrupt is over.

13. A FIFO unit for use in buffering serial communication comprising:
    a. serial input means;
    b. serial output means;
    c. a plurality of storage units, coupled to receive serial data form the serial input means and to provide date to the serial output means; and
    d. control means including
       i. means for maintaining a single pointer to the storage units; and
       ii. means, responsive to an interruption during reading from the storage units, for resetting the pointer without erasing contents of the storage unit, so that data can be resent from the FIFO unit after the interruption is over without reloading the FIFO unit.

14. The unit of claim 1, wherein the input and output are unidirectional.

\* \* \* \* \*